July 14, 1953 C. N. EDWARDS 2,645,031
APPARATUS FOR DRYING FILMLIKE MATERIALS
Filed Feb. 7, 1950 2 Sheets-Sheet 1

Inventor
CHARLES N. EDWARDS

July 14, 1953     C. N. EDWARDS     2,645,031
APPARATUS FOR DRYING FILMLIKE MATERIALS
Filed Feb. 7, 1950     2 Sheets-Sheet 2

Inventor
CHARLES N. EDWARDS

Patented July 14, 1953

2,645,031

UNITED STATES PATENT OFFICE 2,645,031

APPARATUS FOR DRYING FILMLIKE MATERIALS

Charles N. Edwards, Washington, D. C., assignor to Hispeed Equipment, Inc., New York, N. Y., a corporation of New York Application February 7, 1950, Serial No. 142,862

4 Claims. (Cl. 34—48)

(Granted under Title 35, U. S. Code (1952), sec. 266)

This invention relates to a method and apparatus for drying plastics, paper, fabrics and the like. In particular, it relates to apparatus for rapidly drying moist plastic or otherwise non-rigid, permeable or non-permeable films or supports which may be coated or uncoated and are moist or in thoroughly soaked condition.

Existing apparatus and methods for accomplishing this accelerated drying generally involve a relatively large drying chamber in which the plastic, e. g. the film and its support, is passed over a series of drums and is subjected to the desiccating action of heated air passing through the chamber. The method, when accelerated drying is desired, generally includes the preliminary step or removal of all liquids or solutions which may be on the outer surfaces of the film or support. This step is followed by the removal of water which may be in the pore or interstitial spaces in the film and the support. This step is accomplished by a drying atmosphere which may be warmed or heated dry air.

As is well known, the air for the drying of the film or support may be conditioned for rapid drying in any one of the three following ways:

1. The air to be used may be cooled to a temperature below its dewpoint, which results in the condensation and precipitation of the moisture in excess of the carrying capacity at that temperature. The air may then be heated to ambient temperature or above thereby greatly increasing its evaporative capacity.

2. The air to be used may be merely heated, thereby being expanded, the relative proportion of liquid vapor per unit volume being thereby decreased with a consequent increase in evaporative capacity. Furthermore, heating the drying air also accelerates the molecular co-mingling of the liquid and the air molecules thus accelerating the drying action.

3. The air to be used may be dried by passage through a hygroscopic material such as activated silica gel, calcium chloride or sulphuric acid, which may react chemically or physically to remove the liquid vapor from the air.

The drying of the film or support may also be accelerated by the application of energy in the form of heat to the film or support to quicken the molecular activity of the liquid contained therein and thus increase its vapor tension and the rate of evaporation. The film or support may be heated by contact with a heated drum or other similar device. Also infrared light may be successfully used in drying of film coatings, the energy of the infra red ray being absorbed and converted to heat by silver or other metal particles present in the coating or support in direct proportion to the amount of metallic particles present.

The disadvantages of the prior art apparatus in which the drying operation is controlled by any of the above described methods lie in the disproportionately large and bulky equipment required, the power required to operate the moving parts and to produce heat or radiant energy and the cost of maintaining chemical or physical drying agents. Large volumes of dried air are required and wherever speed of drying is critical, excessively dry and hot air must be used—a condition which tends to produce film brittleness and scorching and the setting up of internal strains in the film base with resultant image distortion and dimensional instability.

It is therefore the general object of the invention to provide apparatus for the rapid drying of film like material or supports which is compact and of relatively small overall dimensions.

It is also an object of the invention to provide apparatus for drying plastic film structures and the like wherein the upper and lower surfaces of the film structure are bathed in a rapidly moving current of compressed air at ambient or relatively low temperature.

It is a further object of the invention to provide apparatus for the drying of plastic film structures and the like wherein the film structure is moved through the apparatus by the frictional contact of the air stream with the surfaces of the film structure.

It is an additional object of the invention to provide apparatus for the drying of plastic film structures and the like wherein the film structure in passing therethrough is subjected to high frequency vibration such as sonic and ultrasonic for the purpose of increasing the rate of removal and evaporation of the interstitial liquid.

It is a specific object of the invention to provide apparatus for the rapid drying of photographic film.

It is a further object of the invention to provide apparatus for the rapid drying of film-like structures in which there are no mechanically moving parts.

Other objectives such as economical cost of manufacture of the apparatus, sturdiness of construction, etc., will be apparent from the following description and the drawings hereto appended.

The attainment of these objectives with the overcoming of the disadvantages of the prior art apparatus is accomplished by the relatively simple apparatus of this invention to be described hereinafter and illustrated in preferred embodiments in the accompanying drawings wherein the same reference characters in the different figures designate the same elements and wherein Fig. 1 is an isometric view, partly cut away, of a simple form of the invention showing the film in drying position in the drying passageway.

Figure 1:
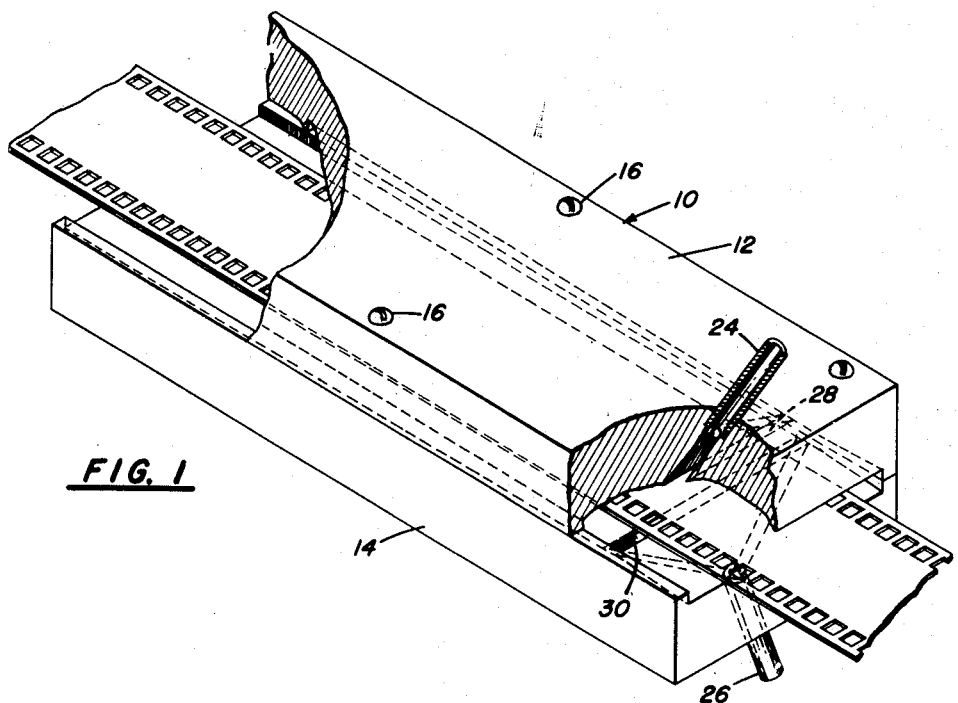
Figure 2:
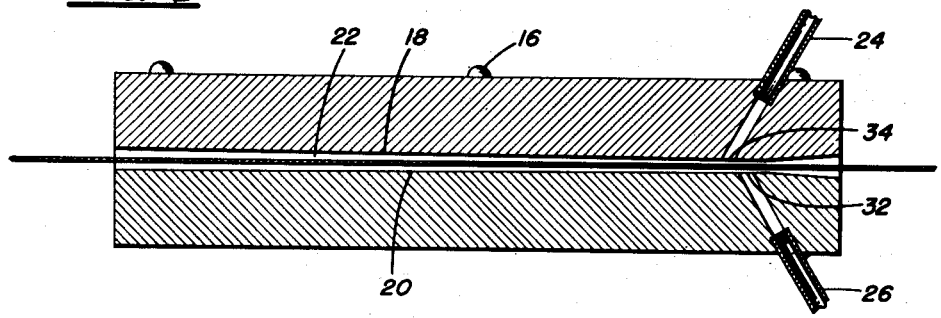
Fig. 2 is a longitudinal vertical cross section taken along the longitudinal center line of Fig. 1 showing the relationship of the compressed air inlets and the vertical tapering of the drying passageway.

In Fig. 1 the drying apparatus is shown generally at 10. The apparatus herein shown in its simplest embodiment comprises an upper member 12 and a lower member 14 which may be fastened together by any suitable means such as machine screws 16. The abutting faces of these two members may be cut away or formed as at 18 and 20 in Fig. 2 to constitute a passageway 22 within and between these two members. This passageway may be tapered longitudinally and vertically to provide a restriction 62 intermediate the ends of the passageway from which two diffusers eminate. The taper may be of the order of 1° in the vertical dimension of the passageway increasing both toward the feed end and the discharge end from a throat point within the passageway. The surface of passageway may be protectively coated to prevent corrosive action by the photographic chemicals which may be carried in dilute solution by the liquid in and on the film structure. Compressed air inlet ducts are shown at 24 and 26. These ducts are connected to a source of compressed air (not shown). At their discharge ends they fan out to the full width of the passageway as shown in dash line at 28 and 30. These compressed air inlets discharge air into the passageway in the form of sheets which may be offset with respect to each other as shown in Fig. 2 at 32 and 34. The effect of the offsetting of the air inlets is that the film as its feeds into the passageway is first bent upwardly by the blast of air coming from the lower inlet and then downwardly by the blast of air coming from the upper inlet. This continuous flexing of the film imparts a vibration of very high frequency thereto which decreases in amplitude and frequency as the film moves through the passageway. The effect of this vibration on the rate of drying will be discussed hereinafter.

Figure 3:
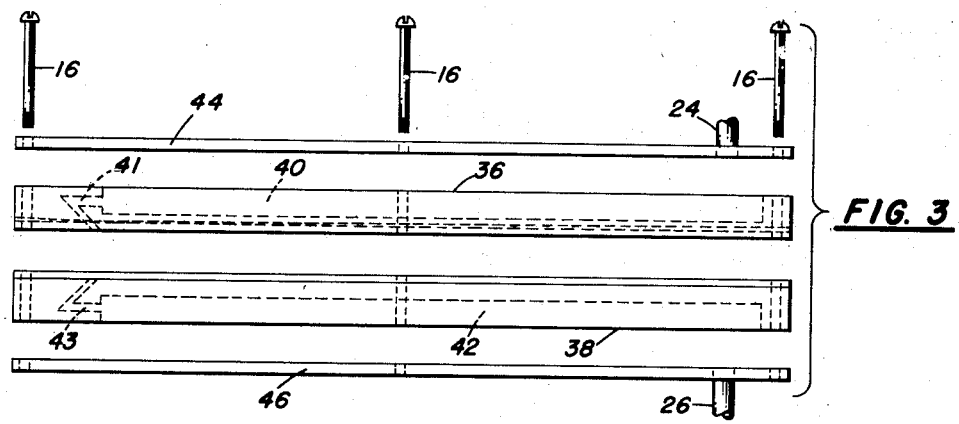
Fig. 3 is a side elevation in exploded form of a larger embodiment of the invention.
Figure 4:
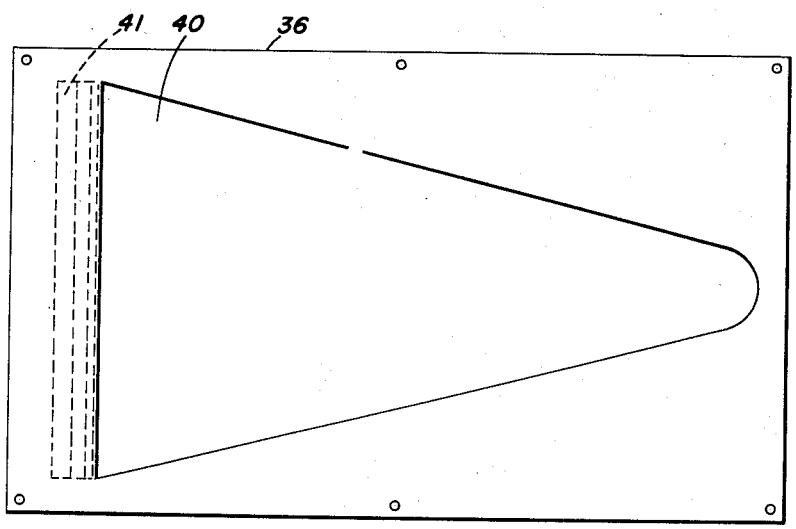
Fig. 4 is a top plan view of the upper member of the apparatus showing a preferred configuration of the air chamber.
Figure 5:
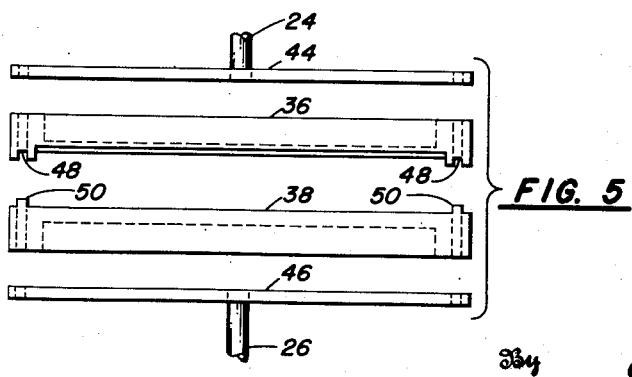
Fig. 5 is an end elevation, in exploded form, of this larger embodiment showing particularly the lateral dovetailing construction of the upper and lower members.

An embodiment of the invention for drying film structures of greater width is shown in Figs. 3, 4 and 5. In Fig. 3 members 36 and 38 are shown as being provided with air chambers 40 and 42, respectively. The function of these air chambers is to provide spaces in which the drying air may be heated to a predetermined temperature in order to increase the rate of drying without scorching or rendering the film brittle. A configuration, which is preferred, of air chamber 40 is shown in Fig. 4. Top and bottom plates 44 and 46 are adapted to be firmly attached to members 36 and 38 by suitable means such as screws 16 which may extend through the top plate 44, members 36 and 38 and threadedly engage bottom plate 46. In Fig. 5 a suitable means of sealing passageway 22 laterally is shown in the dovetail joints 48 and 50. Conduits for the introduction of dry compressed air into the air chamber are shown at 24 and 26. As stated above these air chambers may be provided with electrically operated heating elements such as resistance wires or other means which under thermostatic control heat the incoming air to a desired temperature.

Figure 6:
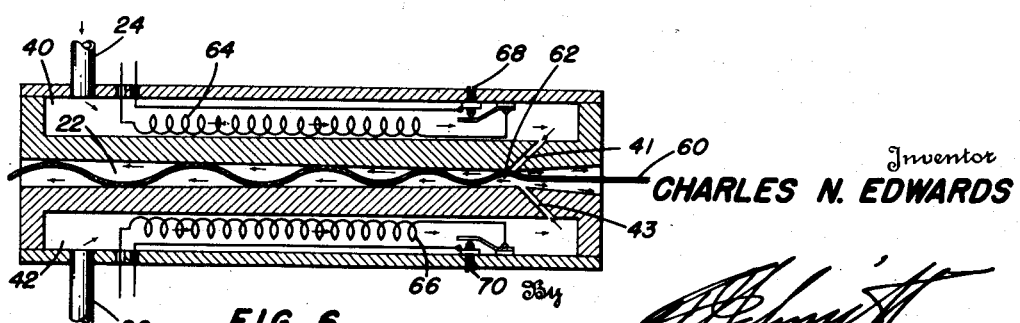
Fig. 6 is a longitudinal section taken through an embodiment of the invention of the type illustrated in Figs. 3, 4 and 5.

The sectional view shown by Fig. 6 illustrates the method of operation of this invention. Here wet film 60 with its support is fed into the feed end of the drier into the restriction or throat 62 of passageway 22.

Compressed dry air, flowing in the direction indicated by the arrows, enters air chambers 40 and 42 from conduits 24 and 26, respectively. It passes around and through electrical resistance coils 64 and 66 which are controlled by preset thermostatic switches 68 and 70 and discharges from these air chambers through ducts 41 and 43 into passageway 22. The air from duct 43 impinges upon the film bending it upwardly. As the film moves forward compressed dry air from duct 41 impinges upon the upper surface of film 60 bending it downwardly. As stated supra, because of this continual bending of the film in sequentially opposite directions it is caused to vibrate at a very high frequency—as high as sonic and ultrasonic depending on the physical characteristics of the film structure such as elasticity and stiffness, the relative positioning of the air inlet slots, and the air pressure.

A part of the air impinging on the film counterflows out through the entrance sweeping the liquid adhering to both surfaces before it in a type of squeegee action. The film arriving at the throat of the passageway is superficially dry.

The film is moved through the passageway by the frictional contact of the two opposed blasts of air with the surfaces of the film. As the film moves through the passageway it continues to vibrate in the form of a sine wave but at a decreasing amplitude and frequency because of the drop in air pressure. This high frequency vibration and flexing of the film has a peculiar effect on the liquid which may be present in the pore or interstitial spaces in the support and in the film itself if it is not impervious. Apparently, this rapid vibration causes the liquid to move out to the surface from the interstitial spaces and to be rapidly evaporated by the ambient dry air before leaving the exit end of the passageway. In passing through the apparatus the film does not touch the surfaces of the passageway at any point since it is cushioned and separated therefrom on all sides by rapidly moving currents of compressed air. This prevents scratching and marring of the coated, developed surface of the film.

In comparative test runs the drier of this invention having overall dimensions of about 12" x 2" x 1" has thoroughly dried 16 mm. and 35 mm. film at the rate of 55 feet per minute as compared with about 5–10 feet per minute generally obtained by prior art equipment having a space requirement of about 15 cubic feet.

The embodiment shown in Figs. 3, 4 and 5, having overall dimensions of about 18" x 10" x 2⅜" operating on dried air heated to about 100° F. has thoroughly dried 10" film at the rate of 20 feet per minute as compared with about one foot per minute generally obtained in a prior art drying chamber having a space requirement of about 10 cubic feet. The space economy for a much increased rate drying capacity and the efficiency in operation of this inventor's apparatus is thus readily apparent.

While specific embodiments of the invention have been herein described and disclosed in the drawings, it is not desired to be strictly limited thereto since obviously one skilled in the art could make changes in the particular structure disclosed, such as variation in the taper angle of the passageway, the configuration of the air chamber, the overall dimensions and means of fastening the component elements together without departing from the spirit and scope of the invention. Such modifications are included in the invention to the extent as defined by the herewith appended claims.

The invention described herein may be manufactured and used by or for the Government of the United States of America for governmental purposes without the payment of any royalties thereon or therefor.

What is claimed is:

1. Apparatus for the rapid drying of plastic films and the like by the movement of said plastic films therethrough comprising a housing body, a passageway for the conduction of said plastic films extending centrally and longitudinally through said body, conduit means in said body for introducing into said passageway a gaseous drying medium under pressure to move forward said plastic films and the like in said passageway and to rapidly dry them therein, said housing comprising at least two members attached together with said passageway symmetrically positioned in and between said members, said passageway increasing in vertical dimension toward both the inlet and discharge ends from a throat point therein, said conduit means including at least one conduit in each of said members for introducing into said passageway near said throat at an inclination in the direction of movement of the plastic films and the like through said passageway a dried gaseous medium under pressure to move said plastic films and the like through said passageway and to rapidly dry them therein.

2. Apparatus as defined in claim 1 wherein the conduits as therein defined are positioned in offset relationship with respect to each other and with respect to the longitudinal dimension of said passageway.

3. Apparatus as defined in claim 1 wherein each of said members comprises an air heating chamber, said conduits being connected to said chamber for the conduction of the gaseous drying medium therethrough prior to entry into said passageway, and thermostatically controlled electrical heating means in said chamber for heating said gaseous drying medium as it is conducted therethrough.

4. Apparatus as defined in claim 1 wherein the conduits as therein defined are positioned in offset relationship with respect to each other and the longitudinal axis of said passageway in order to direct streams of gaseous drying medium to impinge in offset relationship with respect to each other upon opposed surfaces of said plastic films whereby said films are caused to vibrate at relatively high frequency and to be moved through said passageway.

CHARLES N. EDWARDS.

References Cited in the file of this patent

UNITED STATES PATENTS

| Number | Name | Date |
|---|---|---|
| 1,556,057 | Wheller | Oct. 6, 1925 |
| 1,847,915 | Bailey | Mar. 1, 1932 |
| 1,930,575 | Wynd et al. | Oct. 17, 1933 |
| 2,012,115 | Woodruff | Aug. 20, 1935 |
| 2,024,079 | Whiting | Dec. 10, 1935 |
| 2,194,565 | Moss | Mar. 26, 1940 |
| 2,289,753 | Capstaff | July 14, 1942 |
| 2,306,607 | Horton | Dec. 29, 1942 |
| 2,323,918 | Kiernan | July 13, 1943 |
| 2,351,549 | Schwartz | June 13, 1944 |
| 2,393,243 | Franz | Jan. 22, 1946 |